United States Patent
Shinomiya

[11] Patent Number: 6,019,334
[45] Date of Patent: Feb. 1, 2000

[54] CUP HOLDER WITH DIVIDED LID PORTIONS

[75] Inventor: Ken Shinomiya, Utsunomiya, Japan

[73] Assignee: Nifco Inc., Yokohama, Japan

[21] Appl. No.: 09/064,090

[22] Filed: Apr. 22, 1998

[51] Int. Cl.⁷ .............. A47K 1/08; A47C 7/62; B60R 7/00
[52] U.S. Cl. ................ 248/311.2; 297/188.14; 224/282
[58] Field of Search .............. 248/311.2, 310; 297/188.16, 188.07, 188.19, 188.14, 188.15, 188.17, 188.18; 224/278, 281, 282, 926, 42.45; 220/819, 826, 829

[56] References Cited

U.S. PATENT DOCUMENTS

| 5,018,633 | 5/1991 | Toth et al. .................... 248/311.2 |
| 5,505,516 | 4/1996 | Spykerman et al. ............ 248/311.2 |
| 5,562,331 | 10/1996 | Spykerman et al. .......... 297/188.16 |
| 5,680,974 | 10/1997 | Vander Sluis ................. 248/311.2 |

FOREIGN PATENT DOCUMENTS

| 4200823A1 | 7/1993 | Germany . |
| 3-86853 | 9/1991 | Japan . |
| 5-32137 | 4/1993 | Japan . |
| 5-78634 | 10/1993 | Japan . |
| 6-78561 | 11/1994 | Japan . |
| 7-37812 | 7/1995 | Japan . |
| 10-6836 | 1/1998 | Japan . |

Primary Examiner—Derek J. Berger
Assistant Examiner—Michael Nornberg
Attorney, Agent, or Firm—Kanesaka & Takeuchi

[57] ABSTRACT

A cup holder of the invention is attached to a panel or console of a vehicle. The cup holder is basically formed of a case with an inclined opening and a recessed portion extending downwardly from the opening, a lid formed of first and second lid portions, a link connected to the first and second lid portions, and a spring device connected between one of the first and second lid portions and the case to rotate the one of the first and second lid portions to at least one of the open and close directions. The first and second lid portions are pivotally connected to opposite sides of the case for covering the opening. The first and second lid portions have open positions for revealing the opening, and closed positions for covering the opening. Also, the link is connected to the first and second lid portions so that when one of the first and second lid portions is moved, the other of the first and second lid portions is moved in association therewith. The cup holder can be easily opened with a simple link mechanism. Also, the lid portions can be stably held in the open position to properly support a cup.

13 Claims, 4 Drawing Sheets

CUP HOLDER WITH DIVIDED LID PORTIONS

BACKGROUND OF THE INVENTION AND RELATED ART STATEMENT

The present invention relates to a cup holder with divided lid portions for opening and closing an opening formed at a middle portion of the cup holder.

A conventional cup holder comprises a hollow case with an opening for inserting a cup, can or container, and a cover or lid rotationally attached to the case for opening and closing the opening, such as disclosed in Japanese Utility Model Publications (KOKAI) No. 5-32137 and No. 5-78634. In this conventional cup holder, since the cover is formed as one unit and is displaced at a side of the case, it is difficult to provide a space for opening and closing the cover. Also, when the cover is opened, an operation amount is relatively large, so that the operation ability is not so good.

In Japanese Patent Publication (KOKAI) No. 10-6836, an upper surface of a case is inclined obliquely, and a lid is divided into two portions rotationally attached to the case. In a closed position, the lid portions cover the opening, and in an open position, the lid portions are located at both sides of the case. This cup holder requires a complicated link mechanism for connecting the lid portions, and the lid portions can not be stably held in the closed position.

In addition to the above, conventional cup holders or article holders may have a locking mechanism for locking a lid relative to a case, a gear mechanism for opening and closing a lid, and a link mechanism for moving two pars. As the locking mechanism, a cam and spring mechanism is known, such as disclosed in Japanese Utility Model Publications (KOKAI) No. 7-37812 and No. 3-86853. As the gear mechanism, Japanese Utility Model Publication (KOKAI) No. 6-78561 is known. Further, as the link mechanism, German Publication DE 42 000 823 A1 is known. These mechanisms are generally used separately or independently.

The present invention has been made to improve the conventional cup holder, and an object of the invention is to provide a cup holder with divided lid portions which can be easily opened with a simple link mechanism.

Another object of the invention is to provide a cup holder as stated above, wherein the lid portions can be stably held in an open position to properly support a cup.

A further object of the invention is to provide a cup holder as stated above, wherein the lid portion can be used as a support for holding a cup.

Further objects and advantages of the invention will be apparent from the following description of the invention.

SUMMARY OF THE INVENTION

A cup holder of the invention is basically designed to be attached to a front panel or a center console of a vehicle. When the cup holder is not used, an opening for holding a cup or container is closed by a lid, and when the cup holder is used, the lid is opened to reveal the opening and a recessed portion, into which a cup or container is inserted.

The cup holder of the invention basically comprises a case having an inclined opening and a recessed portion extending downwardly from the opening, a lid formed of first and second lid portions, a link connected to the first and second lid portions, and a spring device connected between one of the first and second lid portions and the case to rotate the one of the first and second lid portions to at least one of the open and close directions. The first lid portion is pivotally connected to one side of the case for covering one part of the opening, and the second lid portion is pivotally connected to the other side of the case for covering the other part of the opening. The first and second lid portions have open positions for revealing the opening, and closed positions for covering the opening. Also, the link is connected to the first and second lid portions so that when one of the first and second lid portions is moved, the other of the first and second lid portions is moved in association therewith.

In the first aspect of the invention, the link has means to provide play relative to the second lid portion. Namely, in the closed positions, in case the first lid portion is moved to open the same, the movement of the second lid portion is delayed in a predetermined range. Accordingly, the first and second lid portions can be easily opened. The play is especially useful when the first and second lid portions are urged by the spring device to the open positions or the closed positions.

In this respect, the link has a first link shaft at one end pivotally connected to one flange of the first lid portion, and a second link shaft at the other end thereof. A flange connected to the second lid portion has an eccentric opening with a clearance engaging the second link shaft. When the link is initially pulled by the movement of the first lid portion, the initial movement of the link is not transferred to the flange of the second lid portion because of the clearance. The eccentric opening and the second link shaft form the means to provide play.

In the invention, the spring device includes one end connected to the case and the other end connected to a portion of a flange attached to the first lid portion. This portion is located at a side away from the opening relative to a first axis for connecting the flange of the first lid portion to the case when the first lid portion is in the closed position, and is located at a side close to the opening relative to the first axis when the first lid portion is in the open position. Thus, the first and second lid portions are held stably in the open and closed positions by the one spring device.

In a second aspect of the cup holder of the invention, the lid is also formed of the first and second lid portions pivotally connected to the case. The first and second lid portions have first and second end portions. When the first and second lid portions are located in the open positions, the first and second end portions contact the case to securely stop the movements of the first and second lid portions.

In the second aspect, the link also includes the first and second link shafts pivotally connected to the flanges of the first and second lid portions. In the closed positions, however, the first link shaft is located close to a line linking between an axis for connecting the flange of the first lid portion to the case and the second link shaft. Thus, in the closed position of the first lid portion, when the first lid portion is initially pushed to open the first lid portion, the link is slightly moved without moving the second lid portion. The first link shaft located close to the above line provides play relative to the second lid portion.

In the second aspect, the spring device is disposed between the first lid portion and the case to always urge the first lid portion toward the open position, and the cup holder further includes locking means for locking the first lid portion in the closed position. The locking means includes a cam groove formed in the flange of the first lid portion, and a locking spring attached to the case and disposed in the cam groove to restrict movement of the first lid portion along the cam groove.

The case in the second aspect includes an upper surface having first and second surfaces located under the respective first and second lid portions when the first and second lid portions are in the closed positions. The first surface is inclined relative to the second surface so that the first lid portion can be pushed toward the case for opening the first lid portion when the first lid portion is in the closed position. Accordingly, the locking means is released to open the first lid portion. The second lid portion is opened and closed in association with the movement of the first lid portion.

In the second aspect of the invention, the case has an outer projection contacting the first end portion when the first lid portion is in the open position. Also, the second lid portion is pivotally connected to the case at a lower side of the opening. When the second lid portion is in the open position, the second lid portion extends upwardly from a part of the opening to support a part of a cup disposed in the recessed portion of the case. Since the second lid portion partly support the cup, the cup holder can be installed in a small space. Still, the cup holder can securely hold the cup therein.

DETAILED DESCRIPTION OF PREFERRED EMBODIMENTS

Figures 1, 2, 3:
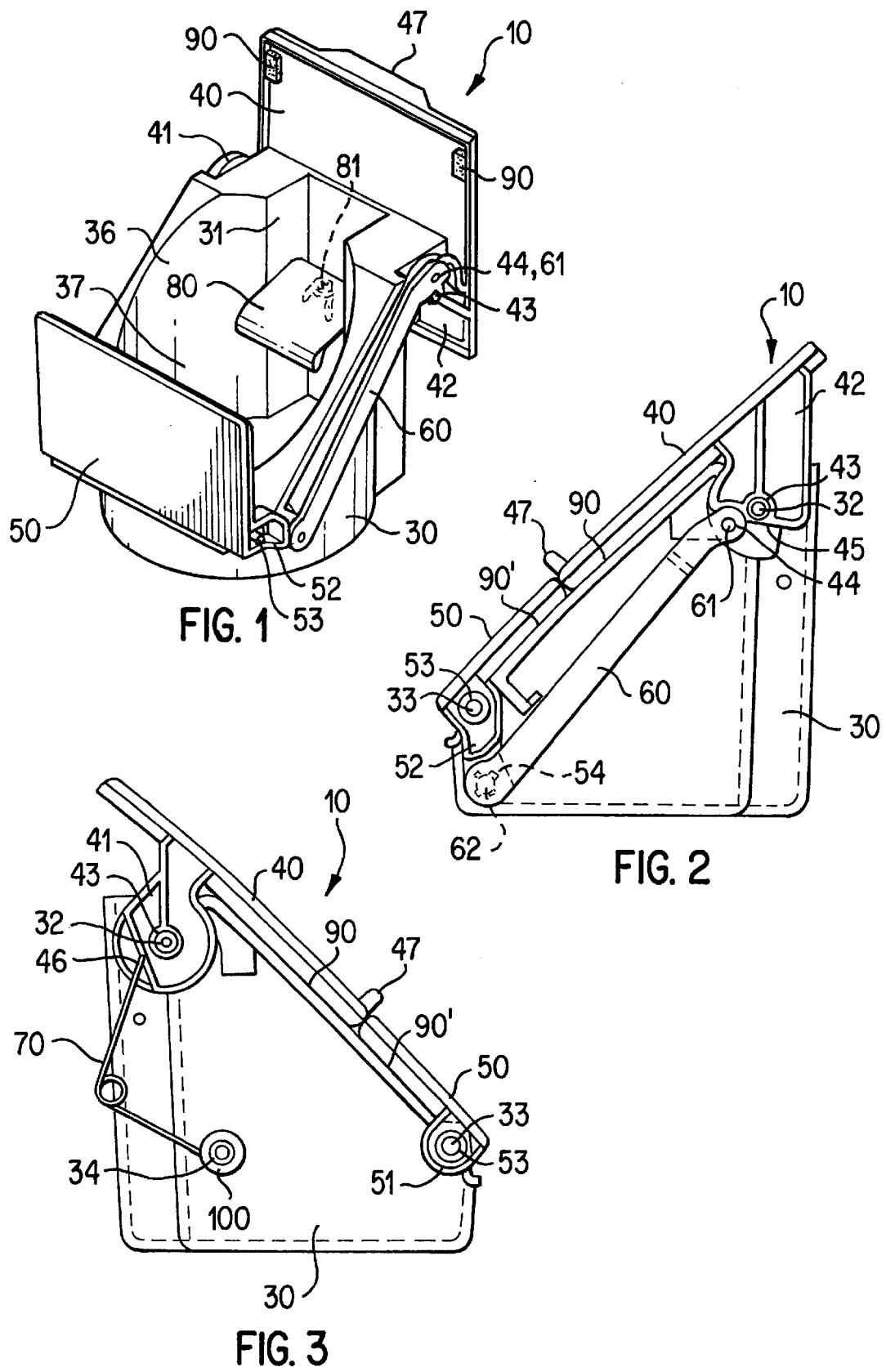
FIG. 1 is a perspective view of a first embodiment of a cup holder of the invention in a lid open position.
FIG. 2 is a right side view of the first embodiment of the cup holder in a lid closed position.
FIG. 3 is a left side view of the first embodiment of the cup holder in the lid closed position.

With reference to FIGS. 1–8, a first embodiment of a cup holder 10 of the invention will be explained. The cup holder 10 is situated inside a front panel (not shown) of a vehicle. When the cup holder 10 is used, a cover or lid is opened to hold a cup, can, bottle and so on.

The cup holder 10 is formed of a case 30 having an upper opening 36 and a depression 37 extending downwardly from the upper opening 36 for receiving a cup therein, and a lid having an upper lid portion 40 and a lower lid portion 50. An upper side of the upper lid portion 40 and a lower side of the lower lid portion 50 are pivotally attached to the case 30. Free sides of the upper and lower lid portions 40, 50 are disposed close to each other when the opening 36 is closed. The inner surfaces of the upper and lower lid portions 40, 50 face each other in an open position.

The upper and lower lid portions 40, 50 are, as shown in FIG. 1, connected together through a link arm 60 for transmitting a rotational force therebetween. Also, a spring 70 is disposed between the upper lid portion 40 and the case 30.

The spring 70 is arranged such that the urging directions of the spring 70, i.e. the upper lid portion 40 is opened or closed, change in a middle of the rotation of the upper portion 40. Also, in the case 30, a pusher 80 with a spring 81 is situated for urging the pusher 80 inwardly to resiliently support a cup, i.e. different size cup when the cup is inserted into the depression 37.

As shown in FIG. 1, the depression 37 of the case 30 has an ellipsoidal columnar shape, and an upper surface of the case 30 is inclined obliquely to correspond to the surface of the panel (not shown). A wide groove or depression 31 is formed at a back side of the depression 37 to receive the pusher 80 therein. As shown in FIGS. 2 and 3, the case 30 includes, at both outer sides, a pair of upper cylindrical projections 32 located at an upper side of the inclined case to project outwardly for rotationally supporting the upper lid portion 40, and a pair of lower cylindrical projections 33 located at a lower side of the case to project outwardly for rotationally supporting the lower lid portion 50.

Figure 8:
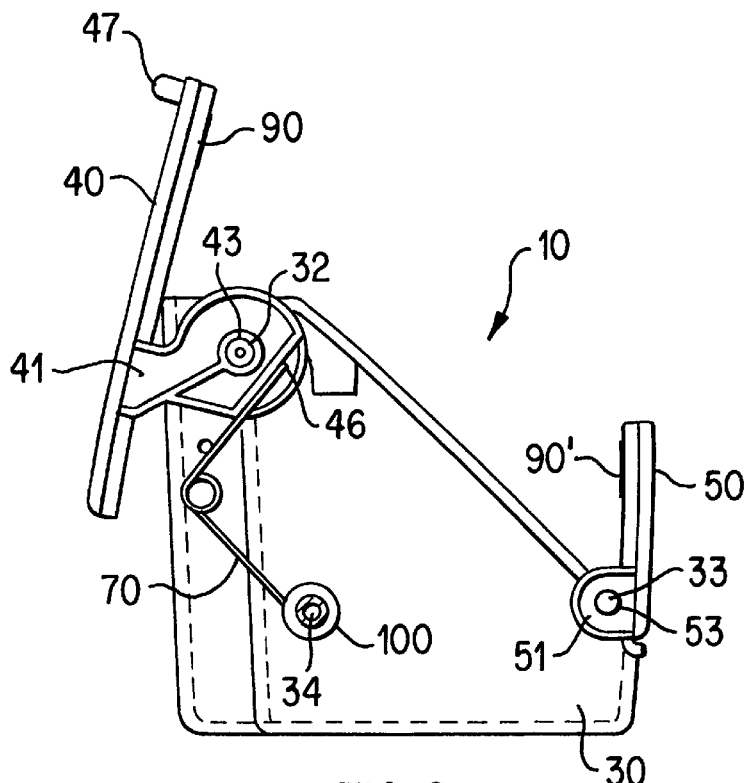
FIG. 8 is a left side view of the first embodiment of the cup holder in the lid open position.

Also, an engaging projection 34 is formed at an outer side surface of the case 30 to hold one end of the spring 70 together with a stop ring 100, as shown in FIGS. 3 and 8.

The upper lid portion 40 is located at an inclined upper side of the case 30, and is longer in length than the lower lid portion 50. The upper lid portion 40 includes at both sides a pair of flanges 41, 42 extending downwardly therefrom. The flanges 41, 42 include shaft holes 43 penetrating therethrough, into which the upper cylindrical projections 32 are rotationally disposed. Thus, the upper lid portion 40 is rotationally attached to the case 30.

The flange 42 at the right side in FIG. 1 includes a link support shaft 44 projecting outwardly from the flange 42 to rotationally support the link arm 60, and a stopper 45 close to the link support shaft 44, which forms a step projecting further outwardly from the link support shaft 44. The stopper 45 abuts against the link arm 60 to limit the maximum opening angle of the upper lid portion 40.

The flange 41 at the left side in FIG. 1 has a hole 46 for receiving an end of the spring 70. Thus, the spring 70 is situated between the hole 46 and the engaging projection 34. As shown in FIG. 3, the hole 46 is located at a side relative to the shaft hole 43. Namely, when the hole 46 passes a line linking between the projection 32 and the engaging projection 34, urging directions of the spring 70 change or reverse.

Namely, when the upper lid portion 40 is in the closed position as shown in FIG. 3, the urging force of the spring 70 acts in the direction to close the upper lid portion 40. In the course of opening of the upper lid portion 40, when the hole 46 passes the line linking between the projection 32 and the engaging projection 34, the urging direction of the spring 70 reverses, and as shown in FIG. 8, the urging force of the spring 70 acts in the direction to open the upper lid portion 40.

Accordingly, when the closed upper lid portion 40 is opened, even if the upper lid portion 40 is released halfway, the upper lid portion 40 opens by the urging force of the spring 70. Reversely, when the opened upper lid portion 40 is closed, even if the upper portion 40 is released halfway, the upper lid portion 40 is closed by the urging force of the spring 70.

Incidentally, an operation piece 47 in an L shape in a cross section is formed at an end portion of the upper lid portion 40 close to the lower lid portion 50. Also, a pair of cushion materials 90 resiliently abutting against the upper portion of the case 30 is formed at the inner portion of the upper lid portion 40, as shown in FIG. 1. The cushion materials 90 prevent noise from being created between the upper lid portion 40 and the case 30 in case the closed upper lid portion 40 contacts the case 30 by vibration during driving or when the upper lid portion 40 is rapidly closed by the urging force of the spring 70.

Figure 7:
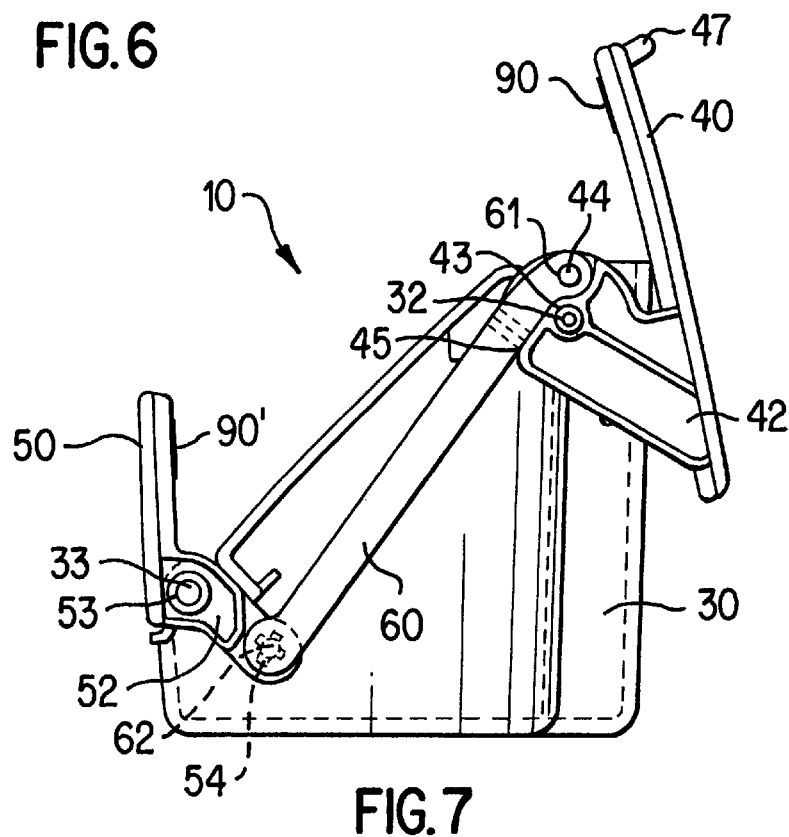
FIG. 7 is a right side view of the first embodiment of the cup holder in the lid open position.

The lower lid portion 50 is located at an inclined lower side of the case 30, and includes at both lower sides a pair of flanges 51, 52 extending downwardly therefrom. The flange 52 at a right side in FIG. 1 has a link support hole 54 for rotationally supporting the link arm 60. Also, as shown in FIGS. 7 and 8, a pair of cushion materials 90' resiliently abutting against the upper surface of the case 30 is attached to the inner side of the lower lid portion 50. The cushion materials 90' prevent noise from being created between the lower lid portion 50 and the case 30 in case the closed lower lid portion 50 contacts the case 30 by vibration during driving. The cushion materials 90' also prevent noise when the lower lid portion 50 is closed.

Figure 4:
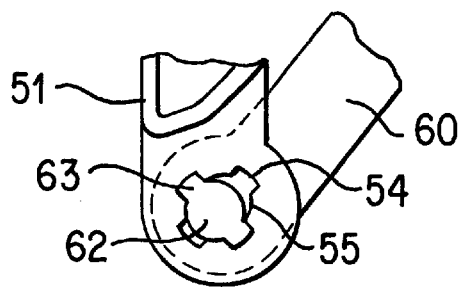
FIGS. 4–6 show enlarged explanatory views for showing a part of a link mechanism used in the first embodiment of the cup holder.
Figure 5:
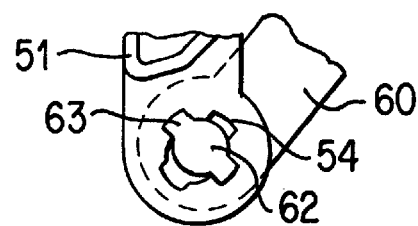
Figure 6:
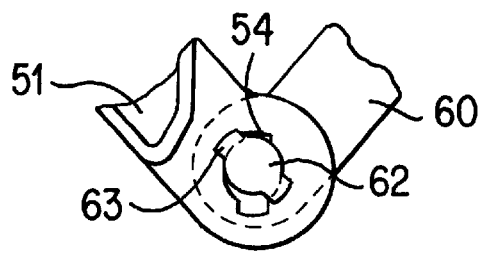

The link arm 60 has an elongated shape as shown in FIGS. 1 and 2. The link arm 60 includes at an upper side a link hole 61 supported by the link support shaft 44 of the upper lid portion 40, and at a lower side a link shaft 62 entering into the link support hole 54 of the flange 52 of the lower lid portion 50. As shown in FIGS. 4–6, the link shaft 62 is formed to have the outer diameter smaller than the link support hole 54, and includes projecting pieces 63 to prevent disengagement of the link shaft 62 from the link support hole 54.

In particular, in the condition that the upper and lower lid portions 40, 50 are closed, a clearance 55 is formed between the link support hole 54 and the link shaft 62, as shown in FIG. 4. When the upper lid portion 40 is being opened, the link shaft 62 is moved toward the clearance 55, as shown in FIG. 5. Therefore, the force to open the upper lid portion 40 is not transferred to the lower lid portion 50 through the link arm 60, so that the lower lid portion 50 keeps its closed condition. As the upper lid portion 40 is further opened, as shown in FIG. 6, the clearance 55 disappears or is eliminated, so that the force to open the upper lid portion 40 is transferred to the lower lid portion 50 through the link arm 60. Thus, as shown in FIGS. 1, 7 and 8, the lower lid portion 50 is opened in association with the movement of the upper lid portion 40.

The pusher 80 is rotationally situated in the depression 31, and the spring 81 urges the pusher 80 upwardly. The pusher 80 is arranged such that the rear end of the pusher 80 contacts the inner wall of the depression 31 so that the rotational angle of the pusher 80 is limited and is inclined obliquely downwardly. In case a large cup is inserted into the depression 36, the pusher 80 is rotated to orient downwardly by a wall of the large cup. In case a small cup is inserted, the pusher 80 is slightly rotated by a wall of the small cup. Thus, even if the size of the cup is different, the cup holder can securely hold the cup.

In the cup holder of the invention, the case 30, upper and lower lid portions 40, 50, link arm 60 and pusher 80 are made of plastic with suitable rigidity, preferably thermoplastic resin, such as ABS.

In operation, when the closed cup holder as shown in FIGS. 2 and 3 is opened, the operation piece 47 on the upper lid portion 40 is held and pulled upwardly. As the upper lid portion 40 is initially opened, the link shaft 62 is moved toward the clearance 55, as shown in FIG. 5. As a result, the force for opening the upper lid portion 40 is not transferred through the link arm 60, so that the lower lid portion 50 is kept in the closed condition.

As the upper lid portion 40 is further opened, the clearance 55 becomes zero as shown in FIG. 6, so that the force for opening the upper lid portion 40 is transferred to the lower lid portion 50 through the link arm 60. Thus, the lower lid portion 50 is opened at the same time in association with the movement of the upper lid portion 40 through the link arm 60. At this time, the upper lid portion 40 is urged in the direction of opening by the urging force of the spring 70. Thus, even if the operation piece 47 is not pulled, the upper and lower lid portions 40, 50 are opened rapidly by the urging force of the spring 70.

In case the upper and lower lid portions 40, 50 are closed after use, the upper lid portion 40 is moved downwardly. When the upper lid portion 40 is closed, the lower lid portion 50 is closed at the same time by the link arm 60. At this time, the upper lid portion 40 is urged rapidly in the closed direction by the urging force of the spring 70. Thus, even if the operation piece 47 is not pushed until the closed position, the upper and lower lid portions 40, 50 are closed rapidly by the urging force of the spring 70.

Figure 9:
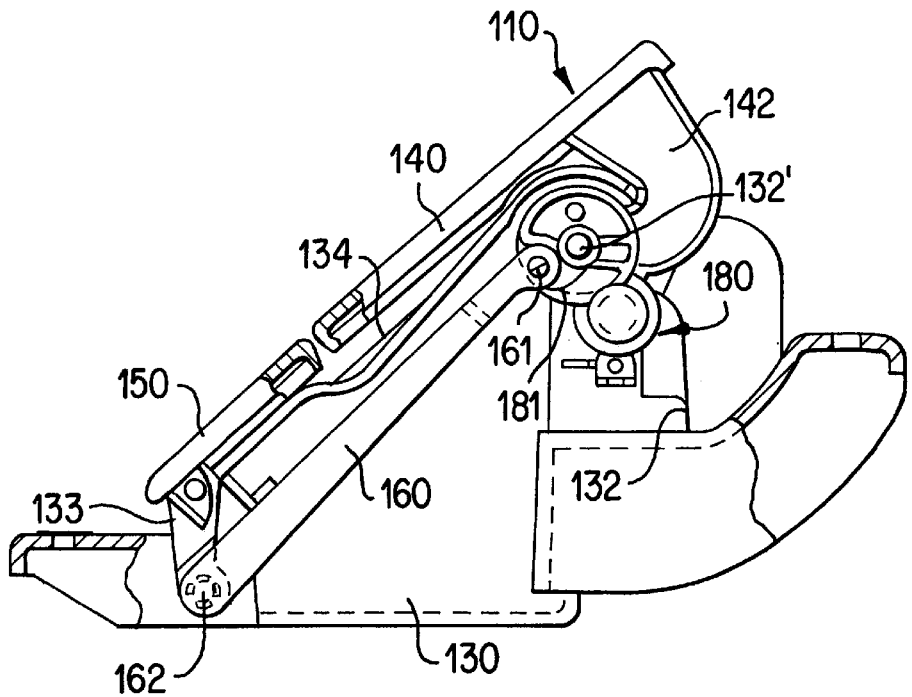
FIG. 9 is a partially cut right side view of a second embodiment of cup holder of the invention in the lid closed position.
Figure 10:
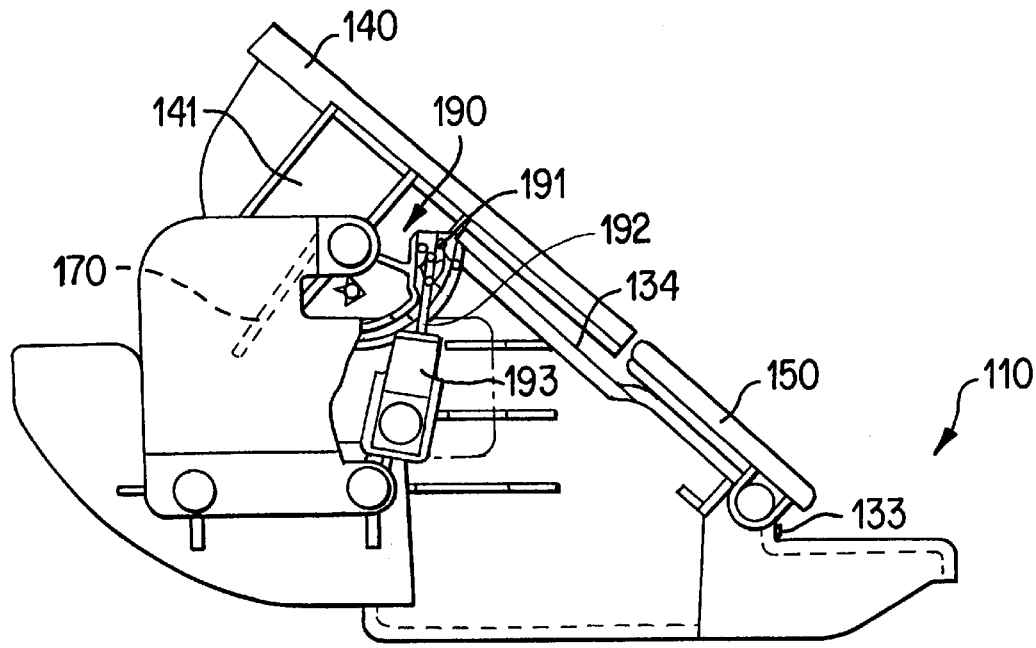
FIG. 10 is a partially cut left side view of the second embodiment of a cup holder in the lid closed position.
Figure 11:
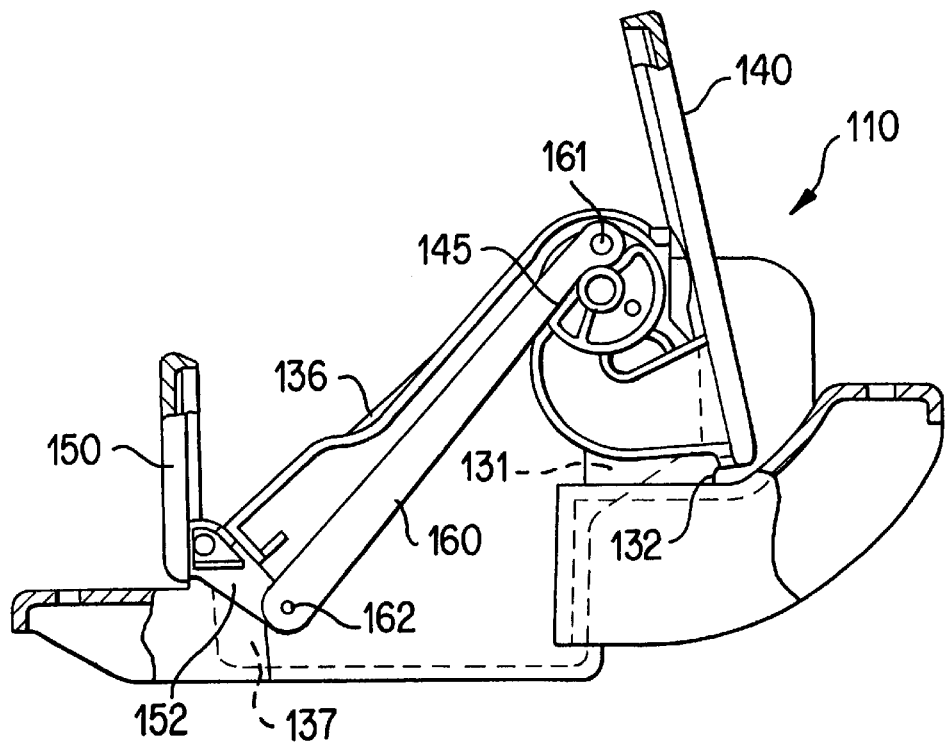
FIG. 11 is a partially cut right side view of the second embodiment of a cup holder in the lid open position.

FIGS. 9–11 show a second embodiment 110 of a cup holder of the invention. The cup holder 110 includes a case 130, upper and lower lid portions 140, 150, and link arm 160, similar to the cup holder 10. However, the cup holder 110 further includes a gear mechanism 180, and locking means 190, explained later. Explanation for the second embodiment is made only for portions different from the first embodiment.

In the cup holder 10, the depression 31 extends through the entire back area of the case 30, but in the case 130, a depression 131 extend at an upper half of the back area of the case 130. Also, the case 130 includes a rear stop 132 at a rear side, a front stop 133 at a front side, and an inclined surface portion 134. When the upper and lower lid portions 140, 150 are opened, an inner edge portion of the upper lid portion 140 abuts against the stop 132, and an inner edge portion of the lower lid portion 150 abuts against the stop 133. Thus, the upper and lower lid portions 140, 150 are held stably at the open positions.

In the case 130, the inclined surface portion 134 is located at an upper portion, i.e. behind the upper lid portion 140 when the upper lid portion 140 is in the closed position. Therefore, in the closed position, a space is formed between the upper lid portion 140 and the case 130. In the closed position, however, the lower lid portion 150 contacts the upper surface of the case 130 without a space.

In the cup holder 110, a spring 170 is disposed between the case 130 and a flange 141 of the upper lid portion 140, similar to the cup holder 10. However, the upper lid portion 140 is always urged in the opening direction by the spring 170.

The gear mechanism 180 is situated between a flange 142 of the upper lid portion 140 and the case 130. Namely, the flange 142 includes teeth 181, with which the gear mechanism 180 engages. The gear mechanism 180 operates such that when the upper lid portion 140 is opened from the closed position, the upper lid portion 140 rotates slowly by a damping operation of the gear mechanism 180. When the upper lid portion 140 is closed, the upper lid portion 140 can be rotated as usual without the damping operation. The gear mechanism 180 is formed of gears and damper known already in the art, such as disclosed in Japanese Utility Model Publication (KOKAI) No. 6-78561 explained before.

The locking means 190 controls the movement of the upper lid portion 140. The locking means 190 includes a cam groove 191 formed on the flange 141 of the upper lid portion 140, and a lock spring 192 attached to the case 130 and located in the cam groove 191. The lock spring 192 is urged toward the flange 141 by a plate spring 193.

In the closed position of the upper lid portion 140, the lock spring 192 engages an engaging part of the cam groove 191. When the upper lid portion 140 is pushed further in the closed direction, the lock spring 192 disengages from the engaging part of the cam groove to allow the upper lid portion 140 to rotate into the open position. When the upper lid portion 140 is closed, the lock spring 192 engages the engaging part of the cam groove 191 again to lock the upper lid portion 140. The locking means 190 is known already in the art, and is disclosed in Japanese Utility Model Publication (KOKAI) No. 6-78561.

The link 160 for connecting the upper and lower lid portions 140, 150 is similar to the link 60, but there is no recess between the link 160 and a flange 152 of the lower lid portion 150. However, in the condition that the upper and lower lid portions 140, 150 are in the closed positions, as shown in FIG. 9, a link support shaft 161 for connecting the link 160 to the flange 142 is located near a line linking between a cylindrical projection 132' for rotating the upper lid portion 140 and a link support shaft 162 for connecting the link 160 to the flange 152. Thus, when the upper lid portion 140 is pushed downwardly in the closed position, the lower lid portion 150 does not move initially. This mechanism provides play between the link 160 and the lower lid portion 150.

In the closed position of the lid, the upper and lower lid portions 140, 150 are located in the inclined plane, as shown in FIGS. 9 and 10. In this condition, when a free end of the upper lid portion 140 close to the lower lid portion 150 is pushed, the upper lid portion 140 is rotated downwardly because of the inclined surface portion 134. As a result, the lock spring 192 in the cam groove 191 is released, and the upper lid portion 140 is opened by the urging force of the spring 170. The lower lid portion 150 is also moved upwardly in association with the movement of the upper lid portion 140 by the link 160. When the upper lid portion 140 is opened, the rotation is slowed by the gear mechanism 180. In the open position, a cup is placed into a depression 137 to be held thereat.

When the cup holder is closed, the upper lid portion 140 is rotated in the closing direction by a user. As a result, the lock spring 192 engages the engaging part of the cam groove 191 to hold the upper lid portion 140 in the closed position. The lower lid portion 150 rotates together with the upper lid portion 140 and is held in the closed position.

In the cup holder 110 of the invention, when the upper and lower lid portions 140, 150 are located in the lid open positions, the inner edge portions of the upper and lower lid portions 140, 150 abut against the stops 132, 133 of the case 130, respectively. Also, a stopper 145 of the flange 142 of the upper lid portion 140 abuts against the link 160, as shown in FIG. 11. Accordingly, the upper and lower lid portions 140, 150 are stably held in the open positions.

In the open position, the lower lid portion 150 extends upwardly from a lower edge of an opening 136 for a depression 137 to support a lower side of a cup inserted into the depression 137. Therefore, even if the lower edge of the depression is not high enough to support a cup sufficiently, the lower lid portion 150 can support the cup in the depression 137. The cup holder 110 can be formed in a narrow space in the cabinet of the vehicle.

The cup holder with the divided lid portions of the invention can be easily opened with a simple link mechanism. Also, the lid portions can be stably held in the open position to properly support a cup. Further, since the lid portion can be used as a support for holding a cup, the cup holder can be formed in a narrow space in the vehicle.

While the invention has been explained with reference to the specific embodiments of the invention, the explanation is illustrative and the invention is limited only by the appended claims.

What is claimed is:

1. A cup holder comprising:
   a case having an inclined opening and a recessed portion extending downwardly from the opening,
   a lid having a first lid portion pivotally connected to one side of the case for covering one part of the opening, and a second lid portion pivotally connected to the other side of the case for covering the other part of the opening, said first and second lid portions having open positions for revealing the opening and closed positions for covering the opening,
   a link connected to the first and second lid portions so that when one of the first and second lid portions is moved, the other of the first and second lid portions is moved in association therewith, said link having means to provide play relative to the second lid portion so that in case the first lid portion is moved at the closed position to open the first lid portion, a movement of the second lid portion is delayed in a predetermined range, and
   a spring device connected between one of the first and second lid portions and the case to rotate said one of the first and second lid portions to at least one of open and close directions.

2. A cup holder according to claim 1, wherein said first lid portion includes a first and second flanges, first axis situated between the first flange and the case, and a second axis situated between the second flange and the case; said second lid portion includes third and fourth flanges pivotally connected to the case; and said link includes a first link shaft at one end pivotally connected to the second flange and a second link shaft at the other end thereof, said third flange having an eccentric opening engaging the second link shaft so that when the link is initially pulled toward the second flange, an initial movement by pulling the link is not transferred to the third flange, said eccentric opening and second link shaft forming said means to provide play.

3. A cup holder according to claim 2, wherein said spring device has one end connected to the case and the other end connected to a portion of the first flange, said portion being located at a side away from the opening relative to the first axis when the first lid portion is in the closed position and at a side close to the opening relative to the first axis when the first lid portion is in the open position so that the first and second lid portions are held stably in the open and closed positions.

4. A cup holder according to claim 3, wherein said second flange includes a stopper engaging the link when the first lid portion is in the open position to stably stop a movement of the first lid portion.

5. A cup holder comprising:
   a case having an inclined opening and a recessed portion extending downwardly from the opening,
   a lid including a first lid portion pivotally connected to one side of the case for covering one part of the opening and having a first end portion, first and second flanges, and first and second axes for pivotally connecting the first and second flanges to the case; and a second lid portion pivotally connected to the other side of the case for covering the other part of the opening and having a second end portion, and third and fourth flanges pivotally connected to the case; said first and second lid portions having open positions for revealing the opening and closed positions for covering the opening so that when the first and second lid portions are located in the open positions, the first and second end portions contact the case to securely stop movements of the first and second lid portions, a link connected to the first and second lid portions so that when one of the first and second lid portions is moved, the other of the first and second lid portions is moved in association therewith, said link including first and second link shafts pivotally connected to the second and fourth flanges, said first link shaft being located, in the closed positions of the first and second lid portions, close to a line linking between the second axis and the second link shaft so that when the first lid portion is initially pushed in the closed position, the link is slightly moved without moving the fourth flange, said first link shaft located close to said line providing play relative to the second lid portion, and a spring device connected between one of the first and second lid portions and the case to rotate at least one of the first and second lid portions to at least one of open and close directions.

6. A cup holder according to claim 5, wherein said second flange includes a stopper engaging the link when the first lid portion is in the open position.

7. A cup holder according to claim 5, further comprising locking means for locking the first lid portion in the closed position, said locking means including a cam groove formed in the first flange and a locking spring attached to the case and disposed in the cam groove to restrict movement of the first lid portion along the cam groove.

8. A cup holder according to claim 7, wherein said case includes an upper surface having first and second surfaces located under the respective first and second lid portions when the first and second lid portions are in the closed positions, said first surface being inclined relative to the second surface so that the first lid portion is pushed when the first lid portion is in the closed position, to thereby actuate the locking means.

9. A cup holder according to claim 8, wherein said spring device is disposed between the first lid portion and the case to always urge the first lid portion toward the open position.

10. A cup holder according to claim 5, wherein said case has an outer projection contacting the first end portion when the first lid portion is in the open position.

11. A cup holder according to claim 10, wherein said second lid portion is pivotally connected to the case at a lower side of the opening so that when the second lid portion is in the open position, the second lid portion extends upwardly from a part of the opening adapted to support a part of a cup disposed in the recessed portion of the case.

12. A cup holder comprising:

a case having an inclined opening and a recessed portion extending downwardly from the opening, a lid including a first lid portion pivotally connected to one side of the case for covering one part of the opening and having a first end portion, first and second flanges, and first and second axes for pivotally connecting the first and second flanges to the case, said second flange having a stopper; and a second lid portion pivotally connected to the other side of the case for covering the other part of the opening and having a second end portion, and third and fourth flanges pivotally connected to the case; said first and second lid portions having open positions for revealing the opening and closed positions for covering the opening so that when the first and second lid portions are located in the open positions, the first and second end portions contact the case to securely stop movements of the first and second lid portions, a link connected to the first and second lid portions so that when one of the first and second lid portions is moved, the other of the first and second lid portions is moved in association therewith, said link having first and second link shafts pivotally connected to the second and fourth flanges directly, and engaging the stopper of the second flange when a first lid portion is in the open position, and a spring device connected between one of the first and second lid portions and the case to rotate at least one of the first and second lid portions to at least one of open and close directions.

13. A cup holder according to claim 12, wherein said first link shaft generally located between the stopper and the second link shaft in the closed positions of the first and second lid portions, and the stopper is substantially located between the first and second link shafts in the open positions of the first and second lid portions.

* * * * *